United States Patent [19]
Thames

[11] Patent Number: 5,945,026
[45] Date of Patent: Aug. 31, 1999

[54] COMPOSITION AND METHODS FOR FIREFIGHTING HYDROCARBON FIRES

[75] Inventor: Ronald E. Thames, Peachtree City, Ga.

[73] Assignee: Hazard Control Technologies, Inc., Fayetteville, Ga.

[21] Appl. No.: 08/832,063

[22] Filed: Apr. 2, 1997

Related U.S. Application Data

[63] Continuation-in-part of application No. 08/334,403, Nov. 4, 1994, abandoned.

[51] Int. Cl.$^6$ .............................. A62D 1/04; A62C 8/00; A62C 35/00
[52] U.S. Cl. .................................. 252/8.05; 252/2; 252/3; 169/44
[58] Field of Search ................... 252/2, 8.05, 354, 252/355, 312, 3; 510/365, 382; 169/44

[56] References Cited

U.S. PATENT DOCUMENTS

| | | | |
|---|---|---|---|
| 3,637,022 | 1/1972 | Kelly et al. | 169/44 |
| 3,639,255 | 2/1972 | Boardman et al. | 516/76 |
| 3,647,001 | 3/1972 | Livingston | 169/44 |
| 3,684,707 | 8/1972 | Livingston | 252/2 |
| 3,956,144 | 5/1976 | Hay | 252/8.8 |
| 4,031,961 | 6/1977 | Globus | 169/47 |
| 4,078,105 | 3/1978 | Shapiro et al. | 427/417 |
| 4,146,064 | 3/1979 | Hughes et al. | 141/3 |
| 4,248,733 | 2/1981 | States, Sr. | 516/58 |
| 4,350,206 | 9/1982 | Hoffman et al. | 169/47 |
| 4,359,096 | 11/1982 | Berger | 169/44 |
| 4,398,605 | 8/1983 | Conklin et al. | 169/47 |
| 4,415,662 | 11/1983 | Thirumalacher et al. | 435/176 |
| 4,461,716 | 7/1984 | Barbarin et al. | 516/15 |
| 4,597,893 | 7/1986 | Byford et al. | 516/39 |
| 4,610,311 | 9/1986 | Bronner et al. | 169/45 |
| 4,713,182 | 12/1987 | Hiltz et al. | 252/3 |
| 4,725,370 | 2/1988 | Greene | 252/8.05 |
| 4,796,702 | 1/1989 | Scherubel | 166/308 |
| 4,804,482 | 2/1989 | Schuler | 252/7 |
| 4,849,117 | 7/1989 | Bronner et al. | 252/3 |
| 4,925,343 | 5/1990 | Raible et al. | 405/60 |
| 4,992,213 | 2/1991 | Mallett et al. | 510/427 |
| 5,061,383 | 10/1991 | Friloux et al. | 252/3 |
| 5,171,475 | 12/1992 | Freiesleber | 510/417 |
| 5,252,138 | 10/1993 | Guymon | 134/42 |
| 5,302,320 | 4/1994 | Hosmer et al. | 516/66 |
| 5,401,426 | 3/1995 | Gerling et al. | 252/8.6 |
| 5,670,469 | 9/1997 | Dingus et al. | 510/274 |

*Primary Examiner*—Joseph D. Anthony
*Attorney, Agent, or Firm*—Vedder, Price, Kaufman & Kammholz; James T. FitzGibbon

[57] ABSTRACT

A biodegradable, non-toxic firefighting concentrate composition. The preferred compositions include 4 to 40 parts of a $C_{16}$–$C_{18}$ tertiary amine having 2–10 ethoxy or other solubilizing groups per mol, 1 to 15 parts of a carboxylic acid having 6 to 16 carbon atoms; 1 to 6 parts of a $C_6$–$C_{16}$ alcohol and 0 to 10 parts of $C_4$-and lower alcohols, and enough water to create a total of 100 parts by volume. The concentrate is usually diluted up to 100 times (v/v) with water, and is also effective when mixed with foam-forming materials. In addition, the composition is useful with soil bacteria for remediating soil contaminated with hydrocarbon fuel and for facilitating fuel dispersion and degradation within bacterial-action sewage systems.

20 Claims, No Drawings

COMPOSITION AND METHODS FOR FIREFIGHTING HYDROCARBON FIRES

This application is a continuation-in-part of application Ser. No. 08/334,403, filed Nov. 4, 1994 now abandoned.

BACKGROUND OF THE INVENTION

The present invention relates generally to compositions and methods for treating fuel hydrocarbons, and more particularly, to organic compositions having two different but functionally related end uses.

In one application, compositions made according to the invention serve to emulsify organic fuels such as gasoline, diesel fuel, kerosene, so-called jet fuel and other liquid hydrocarbons in water, thus providing the potential for extinguishing fires and rendering masses of these materials non-flammable. The compositions are compatible with foam-forming constituents to further their fire extinguishing potential in those applications wherein foam is desired.

In another aspect, the emulsifying ability of the materials can be effectively used to disperse concentrations of such hydrocarbon materials finding their way into soils and ground water to render the hydrocarbons water-transportable and readily subject to degradation by naturally occurring and/or synthetically prepared bacteria or other agents for degrading the hydrocarbons.

Still further, because of the wetting properties of the compositions, they can be effective as a fire extinguishing agent when the fuel is in solid form, i.e., filled natural or synthetic rubber such as is used in rubber tires or the like, and against more viscous but still flammable material such as lubricating oils and other heavy "cuts" of petroleum.

According to the invention, the inventive composition is able to be used by applying it either to surface or subsurface concentrations of hazardous or undesirable hydrocarbons, including masses of gasoline, oil and the like that are spilled on land, and which are intentionally or unintentionally disposed of in sewers, exposed to the soil or the air, or otherwise as the result of an accident of some sort. Chemical breakdown of the dispersed hydrocarbons can be accelerated by increasing the concentration of available bacteria for this purpose. In some cases, the surface active agent ("surfactant") composition itself can serve as a nutrient for the bacteria, thus enhancing its action in degrading the hydrocarbon materials.

In the past, the concept of utilizing surface active agents in water for treating fires has often been suggested. One aspect of the use of surfactants in firefighting is that such treatment can render the water "wetter," i.e., better able to penetrate into and through the surfaces of semi-solid materials.

Moreover, the ability of surfactant materials to create frothing or foaming has been used in an attempt to provide a barrier at the liquid-air interface, which barrier will block oxygen from access to vapor at the liquid surface, usually the surface of a mass of burning oil or gasoline. In this connection, it is well known that, particularly in a petroleum-based fire, the combustion occurs only in the vapor phase, wherein oxygen in large quantities is readily available to the vapors originating within the liquid. In a fire, the increase in temperature accelerates the liquid vaporation and hence the rate of combustion. In many instances, surface active agents, particularly when accompanied by agitation, serve to achieve a mix of liquid water and fuel, thus rendering the fuel less volatile and less susceptible to burning. However, prior approaches to formulating compositions for this purpose have been accompanied by a number of drawbacks, as referred to elsewhere herein.

Referring to another aspect of treating petroleum or like materials following an accident or disaster of some sort, such as an oil spill on land or at sea, the advantage has been taken of the ability of surfactants to disperse oils in water. However, in many cases, the surfactants used introduce drawbacks which partially or completely offset the advantages sought to be gained by their use. Thus, in many cases, surfactants were effective to reduce the surface tension between the oil and the water, causing the oil to spread out and form an exceptionally thin film on the surface of the water. While this may decrease the concentration of oil in a particular area, it was later discovered that it results in extremely adverse effects on marine wildlife. In one aspect, it was found that surfactant treatment exposed wildlife to smaller but still damaging amounts of oil over areas that were increased from a few square yards or acres to areas of many acres or even many square miles. In the case of large ocean oil spills, hundreds or thousands of square miles can be actually affected by a thin film of oil.

A number of other drawbacks and disadvantages also characterized the prior art use of surfactants in attempting to contain the ill effects of oil spills or the like. In some cases, the chemical nature of the surfactant, particularly the oleophilic portion of the surfactant, was itself hazardous or undesirable from an ecological standpoint. Thus, a number of years ago, it was determined that the simple matter of washing oily substances with certain surfactants would be effective to disperse the oil in surrounding water, but it was also found that the surfactant itself was highly persistent and resistant to biological degradation. For example, the use of many surfactants made from highly alkylated cyclopentanes was curtailed, but only when this adverse side effect was discovered.

Another dilemma that has faced workers dealing with oil and gasoline spills, for example, involves attempts to remove the offending material from streets, sidewalks, and lawns, for example, by introducing them into the sewer system. However, it is well accepted that such materials, as presented to the sewage system, are resistant to degradation by resident bacteria in the sewage treatment plants. This being the case, it is apparent that such oily materials are effectively even more resistant to degradation by the much lower concentrations of bacteria naturally occurring in the soil.

Referring to such disposal of petroleum wastes in sewers, this has been discouraged or legislated against because of the persistent nature of the oils and the like, and their long-term resistance to degradation. In extreme cases, oily residues washed into a sewer system can impede the intended operations of a sewage system as well as stubbornly resisting degradation of the contaminants themselves. Consequently, addressing oil spill problems has been difficult and problematical. If allowed to remain untreated, a fire or soil contamination hazard persists, and if treated with the wrong materials, alternative and sometimes equally undesirable hazards can be created.

Still further, while it has been suggested that for each individual oil spill or the like, cleanup workers might find a particularly suitable agent for the job, this is not really helpful. This is because such cleanup or firefighting personnel may not know in advance whether the major hazard is an existing fire, a potential fire, soil contamination, sewage system contamination, or emission of harmful vapors. Thus, it is not practical for emergency crews to be fully stocked with every possible type of chemical agent that might be useful when responding to an emergency.

Under these circumstances, it would be considered very advantageous if a single composition could be provided that would have excellent success when used as an addition to water for firefighting purposes, and which would not create undesirable side effects.

It would also be highly advantageous if there were a waterborne composition which could be used against bodies of hazardous waste such as petroleum spills and the like, and which would render them non-flammable as well as non-objectionably dispersible in ground water. In this connection, it will be understood that a main difficulty with many petroleum-based hazardous wastes is not so much that they never can be attacked by bacteria, but simply the extremely long time it takes for them to be degraded by soil bacteria in the form of naturally occurring microflora and microfauna.

In this connection, it will be understood that many hazardous waste, particularly petroleum wastes, are extremely insoluble in water and thus tend to stay in the soil near the spill area. It is believed that such materials are strongly absorbed onto the non-aqueous components of the soil and remain relatively safe from bacterial degradation for two reasons. One is that they are highly concentrated, and the other is that most bacteria are water-borne or tend to thrive in aqueous environments.

Such bacteria being effective roughly in proportion to their concentration, many bacteria are simply not sufficiently concentrated to degrade large, monolithic petroleum spills within a finite time, especially where the surface-to-volume area of such oily materials is low and the supply of bacteria is also low.

On the other hand, when very finely dispersed, such as by a highly effective surfactant, such materials may be destroyed much more quickly by bacteria, including those which may be naturally occurring, or those which may be supplied to the spill site for this purpose. A mixture of both types can also be used.

Thus, if it were possible to disperse oily materials into sufficiently fine particle sizes and reduce their strong absorption on soil, such materials could then be entrained in the aquifer. Once so dispersed, the oily materials could be biodegraded by water-borne bacteria within a reasonable time. In addition, or in the alternative, the water with the dispersed oils in it could be dealt with by "pump and treat" technology. In the latter connection, it has been found that while such "pump and treat" methods may be effective, their effectiveness depends on the assumption that the material to be treated is a waterborne material. In many cases, this is not functionally true in the sense that, while some materials are waterborne, there are other materials remaining in the soil which only become waterborne after the lapse of months or years, thus almost indefinitely prolonging the "pump and treat" period.

Referring again to prior practices, several attempts to achieve a dispersion of oily materials in water have been unsuccessful because the surfactants in effect increase the toxicity of the oil relative to aquatic life. In particular, many surfactants render the cell walls of animal and plant life more permeable to biological hazards, thus increasing the effective toxicity of certain materials to such marine life. This usually occurs with a surfactant where the oleophilic portion of the molecule is synthetic rather than naturally occurring.

Referring again to bacterial treatment, it would be further advantageous if the surfactant used would also serve as nourishment for the bacteria or make nourishment available from the substrate. It would also be advantageous if a composition of surfactants and other materials could fill the above requirements and also be compatible with foam-forming constituents.

In view of the failure of the prior art to provide a chemical composition for treatment in emulsifying petroleum presenting a fire or spill hazard, it is an object of the invention to provide an improved composition for such purpose.

Another object of the invention is to provide a composition which includes surfactants and other components which are essentially non-toxic, even when used in substantial concentrations.

A further object of the invention is to provide a composition which may be used to treat water used in dispersing petroleum and like wastes in water so as to lower the vapor pressure of such water and expose them to bacterial action.

A still further object of the invention is to provide a composition which, when added to water used to treat petroleum or other hydrocarbons, will free adsorbed hydrocarbons from the soil and convert them into waterborne materials of greatly reduced particle size, able to be degraded by naturally occurring or specially supplied or augmented bacteria.

Yet another object of the invention is to provide a treating composition for water which is usable in a variety of emergency response situations, including petroleum firefighting, and in treating water- and landborne petroleum spills and the like.

Another object is to provide a composition for treatment of petroleum which will render limited amounts of spilled petroleum compatible with sewage systems.

A further object of the invention is to provide a composition for firefighting which includes an especially effective surfactant action and further provide a foaming action and in which the surfactant component for dispersing oil in water is compatible with a stable, high density foam.

A still further object of the invention is to provide a method of treating petroleum to render it non-flammable and dispersible in such a way as to render it susceptible to bacterial attack.

Yet another object of the invention is to provide a method of soil treatment or remediation wherein contaminated soil may be treated by a mix containing specially blended surfactants that are able to render petroleum oils dispersible in ground water and able to be attacked by bacteria including bacteria supplied for the purpose of soil remediation.

Another object of the invention is to provide a chemical composition which is effective to disperse petroleum in such a way that the oil will assume extremely fine particle size and wherein the surfactant is not harmful to aquatic animal and vegetal life.

A further object of the invention is to provide a treating composition for petroleum which includes a surfactant made from an animal tallow modified by chemical treatments including ethoxylation and which further includes selected alcohols and organic carboxylic acids, rendering the mixture dispersible in water and providing a strong emulsifying action for petroleum based fuels and lubricants.

A still further object of the invention is to provide a chemical mixture which is non-harmful to naturally occurring plant and animal life, even when applied to or mixed with petroleum products.

SUMMARY OF THE INVENTION

The foregoing and other objects and advantages of the invention are achieved in practice by providing a chemical composition including from about 7 to about 40 parts of an ethoxylated tallow amine, about ½ to 15 parts of alcohols of low and medium molecular weights and up to about 25 parts of an organic carboxylic acid, with the remainder being water, such that 100 parts are present in the entire composition, with a composition preferably including a preservative and a high visibility dye. The invention also achieves its objects by using a method which includes using the above mixture to disperse oil in water used to extinguish fires, or used to disperse oil spilled on land or water for attack by naturally occurring or added bacteria present in the soil or in waste disposal systems.

The exact manner in which the foregoing and other objects and advantages of the invention are achieved in practice will become more clearly apparent when reference is made to the following examples of practicing the invention set forth by way of illustration, and the discussion regarding such exemplary products, mixtures and methods.

DESCRIPTION OF THE PREFERRED EMBODIMENTS OF THE INVENTION

The present invention may be embodied in different forms and the formulations and methods referred to herein are capable of being varied within certain ranges. Accordingly, several working examples of the manner in which the invention may be practiced can be determined from the following examples set forth by way of illustration only and not by way of limitation.

EXAMPLE 1

The following constituents were prepared and mixed in the following proportions by weight:

| | |
|---|---|
| tallow amine-5 mols ethylene oxide (avg) | 12.5 parts |
| isononanoic acid | 8.0 parts |
| n-octanal/n-decanol in 50/50 mixture | 2.5 parts |
| preservative | 1200 ppm |
| cranberry dye | 900 ppm |
| isopropyl alcohol | 4 parts |
| water (about 73 parts) | sufficient to make 100 parts total. |

To prepare the above mixture, a mixing tank of suitable size is provided and water is added in the above amount. Next, the preservative is added to prevent against bacterial, yeast, or like contamination. Dye sufficient to create a highly visible red color is pre-dissolved in a small amount of water with agitation for four minutes. Next, the isopropyl alcohol is added to the mixing tank and agitated for a period of three to four minutes, after which the pre-mixed dye solution is added and an additional four minutes of mixing are carried out. Next, the tallow amine surfactant is blended into the water with the dye, the isopropyl alcohol and the preservative. Finally, the isononanoic acid and the 50/50 octanol/decanol mixture is added. A strong agitating action is continued to avoid gelling the product, which then comprises a viscous liquid with a brilliant red color.

Having mixed the composition as just described, a specimen petroleum fire was initiated in keeping with an accepted test procedure. This fire is prepared by using a pit which is 80 feet in diameter and has a depth of 3 feet, with a concrete bottom. The pit is filled with water to a depth of about two feet, and a 250 gallon liquid mixture of gasoline and diesel fuel is pumped onto the surface of the water, where the volatile hydrocarbons form a floating layer. The petroleum layer is ignited and permitted to burn for three minutes, emitting a dense, billowing cloud of black smoke. A water pump capable of delivering 100 gpm was actuated and the additive was injected into the water stream downstream of the pump on the basis of 3% of the additive by volume in relation to the water. Upon initial application of the water stream to the burning pool of liquid hydrocarbon, the dark black smoke immediately became a much less dense gray smoke and the fire was extinguished almost immediately. Attempts to reignite the fire after a period of several minutes and one-half hour were equally unsuccessful. Observation showed that the water and petroleum were clearly emulsified presenting a surface layer having a cloudy, milky appearance. The odor of volatile petroleum was absent and the resulting mixture resisted further attempts at lighting.

From the above, it was concluded that the water treated with the above composition was highly effective at extinguishing a fire within an extremely short time. The residue from this attempt was labeled as "treated petroleum—1" and was retained for subsequent analysis.

EXAMPLE 2

A mixture as described was prepared as described above and an identical test was performed, differing from the prior test only in that the percentage of surfactant mixture added to the water supplied by the pump was in the amount of 6% by volume relative to the water. The results were substantially similar to those of Example 1 except that the fire was extinguished even more quickly. The emulsification action was thorough and complete. The material resulting from this experiment was referred to as "treated petroleum—2" and retained for analysis.

Regarding the test performed in the Examples 1 and 2, the emulsion produced appeared to be stable and no phase separation was observed even after a period of several hours. Hence, it was concluded that the fire extinguishing treatment using either of the methods just described would be effective not only to rapidly extinguish the fire, and abate the smoke, but also to render the material resulting from the treatment non-flammable, so as to eliminate any hazard of re-ignition, a common risk with oil and gas fires.

EXAMPLE 3

Next, an identical test was performed using the same material and applying it to the same sort of fire in the same way, except that the surfactant concentrate in water solution was applied in the proportion of 2% concentrate in relation to the water. While the rate of smoke abatement and fire extinguishing was slightly slower, the process was nevertheless highly effective to abate the smoke and extinguish the fire. The performance of the emulsion was substantially the same in that there was no phase separation, and no floating or supernatant hydrocarbon layer appeared, even after several hours. This material comprising the fuel and the extinguisher composition and water was labeled—"heated petroleum—3."

From the foregoing, it was concluded that the concentrate was effective in proportions up to 6% by volume in relation to the applied water, and the active ingredients were present in the concentrate in amounts as little as 20% or less. Subsequent tests proved that volume percentages of concentrate to applied water could be effective at levels as low as 1% to 1½% by volume. These refer to the level of concentrate, with the surfactant level being correspondingly lower.

In the above examples, the product referred to as "tallow amine—5 mols ethylene oxide" is essentially an ethoxylated tertiary amine. The product is believed to be prepared by using as a starting material an animal tallow, known to be a triglyceride of $C_{16}$–$C_{18}$ fatty acids. After rendering the tallow to create the individual fatty acids, the resulting acids are reacted with ammonia to create a fatty acid amide. Subsequently, the amides so prepared are dehydrogenated to form nitrites. Thereafter, the nitriles are rehydrogenated to form amines, in this case a primary fatty amine. Subsequent ethoxylation of the two active hydrogen atoms on the amine groups using ethylene oxide creates an ethoxylated $C_{16}$–$C_{18}$ amine preferably having 1 to 4 ethoxy groups replacing each hydrogen. The tallow amine proven most successful with the present invention carries an average of five mols of ethylene oxide per amine molecule. In such compositions, a number of isomers are created, with 1 to 4 ethylene oxide groups replacing each of the hydrogen atoms and the balance of the five mols being present at the other position. Schematically, such composition may be represented as follows:

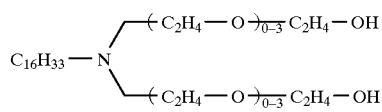

One isomer might be represented as follows:

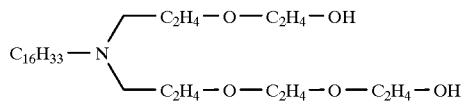

Because the five mols of ETOH is an average number in the above schematic, the number of ETOH groups on any one molecule may significantly exceed a total of five, i.e., there may be fewer than five or up to ten or more groups on any one individual molecule. Thus, the composition is usually to be thought of as a series of homologs and/or isomers. Similar ethoxylated amines derived from homologs of the animal tallow-based products may also be used in keeping with the invention.

Regarding the characterization of the above surfactant, in some respects, the ethoxylated amine may be considered a non-ionic surfactant in that it is not readily ionizable in water. However, in the presence of lower molecular weight organic acids, such as formic and acetic acid, the surfactant may be protonated so as to take on the characteristic of or resemble a cationic surfactant. In the presence of higher or medium weight carboxylic acids, such as the fatty acids, the surfactant acts as a non-ionic surfactant.

The above isononanoic acid is a $C_9$ carboxylic acid, that is believed to exist in a number of $C_9$ isomers; hence, it is also generically known as trimethylhexanoic acid. It is an aliphatic carboxylic acid having a boiling point of about 235° C. at 1,000 mb. The acid is slightly soluble in water and has a pH of about 3.5 at that concentration.

The higher alcohol mixture, i.e., the n-octanol/n-decanol mixture referred to above is preferably about an even or "50/50" mixture of the two alcohols, although a 45/55 mixture has been used successfully.

The preservative used is preferably a solution of sodium di-2-ethylhexyl sulfosuccinate. This composition is identified by code number 3409 in the Merck Index. Preferably, a dipropylene glycol/sodium hydroxide solution is used with the preservative to impart solubility and to promote hyrolysis of the sulfonate salt, as is known to those skilled in the art.

Referring to the cranberry dye, its purpose is to facilitate adjustment of the concentration of the concentrate in water being sprayed. A strong, highly visible dye permits the concentration of the additive in water to be controlled by visual observation and adjustment relative to a visual standard.

EXAMPLE 4

A composition as set forth above was provided except that the tallow amine-ethylene oxide concentration was reduced to 8 pph (parts per hundred) in relation to the composition as a whole. The trimethylhexanoic acid concentration was reduced to 4.5 pph and the $C_8$–$C_9$ alcohol mixture to about 1%. The isopropyl alcohol was reduced to about ½ pph, and the balance was water. In this instance, the water approximated 85–86% of the overall composition. The product was effective in rapidly extinguishing a fire when used in concentrations of between 1% and 6% relative to the firefighting water.

EXAMPLE 5

In this instance, the ethoxylated tallow amine concentration was raised to 38 pph and the $C_9$ acid to 25 pph. The $C_8$–$C_{10}$ alcohols were present at just over 11 pph, and the isopropyl alcohol was present in the amount of 6 pph. In this instance, about 25 pph of water were present. While this mixture is very viscous and requires care in mixing, when diluted in the above ranges and applied to a test fire, it was also found effective to rapidly emulsify and disperse the hydrocarbon fuels, thus rapidly extinguishing the fire and leaving a non-flammable residue.

EXAMPLE 6

A similar composition was made using approximately 20 pph of the tallow amine-ethylene oxide, 15 pph of the acid, 5 pph of the $C_8$–$C_{10}$ alcohol and 4 parts of isopropyl alcohol, with the balance (about 66 parts) being water. This product proved highly satisfactory at all of the various dilution rates referred to above.

EXAMPLE 7

A composition was prepared as in Example 1 except that the $C_9$ acid was replaced with a $C_8$ acid, 2-ethyl caproic acid, also known as 2-ethyl hexanoic acid. While a composition made in this manner was not necessarily preferred as the best presently constituted formulation, it was nonetheless very effective. The $C_8$ acid may, in some circumstances, prove less irritating to human skin and hence more desirable from a handling, manufacturing and/or labeling standpoint than the $C_9$ acid. However, neither of the acids provided an objectionable residue when used as described herein.

EXAMPLE 8

A firefighting composition was prepared in keeping with Example 1 except that the isopropyl alcohol was eliminated entirely. It was determined that, although mixing was rendered somewhat more difficult, it was possible under some conditions to obtain a dispersion of all the ingredients without using any lower aliphatic alcohol. This established that the lower alcohol was not essential, although it was preferred for ease of mixing. Omitting the alcohol may provide some administrative advantages in that compositions containing such alcohols have more stringent labeling requirements than those without the alcohols. A concentrate of this composition was effective to extinguish fires at from between about 1% to 6% or more by volume in water.

EXAMPLE 8A

A firefighting concentrate composition is prepared by mixing various ingredients to form a surfactant concentrate, following which the surfactant concentrate is mixed with a water-biocide solution to form a firefighting concentrate. Finally, this firefighting concentrate as thus prepared is dyed to form a dyed firefighting concentrate. The dye assists users in determining the extent to which the firefighting concentrate should be diluted in water for use as a concentrate-treated firefighting water.

The surfactant concentrate is prepared by mixing a surfactant, an acid and an alcohol, in the proportions identified below:

| Surfactant component: | |
| --- | --- |
| ethoyxlated amine derived from animal tallow (avg. 5 mols ethylene oxide per molecule) | 375 gallons |
| Acid component: | |
| carboxylic acid (2-ethylhexanoic acid) | 227 gallons |
| Alcohol component: | |
| decanol (55+%) octanol (43+%) ethyl-1-hexanol (1%) | 70 gallons |

The foregoing ingredients are thoroughly mixed, preferably at or above room temperature, in a mixing vessel of suitable size, to form a surfactant concentrate. This concentrate has a medium, honey color, and will have a specific gravity of 0.94–0.95, a pH of 5.7–6.5.

Next, a diluting mixture was prepared by adding 2.5 gallons of a suitable biocide ("PROXEL 6XL") to 1,728 gallons of water. The surfactant concentrate is added to the above diluting mixture, and mixed thoroughly (15–30 min.) following which about 2.5 gallons of an intense red dye ("16878 AUTOMATE RED B") are added. This concentrate has a specific gravity of 1.00–1.01, a pH of 5.7–6.5. This firefighting concentrate is suitable for injection into firefighting water in amounts of from about 0.5% to about 6% or more, preferably 2%–3%. The performance of the treated water is excellent, demonstrating rapid fire extinguishing capabilities.

In the above composition of Example 8A, the preferred form of surfactant component may be partially or fully replaced by surfactants of the type described in the discussion above following Example 3. The acid component may be the above-identified acid, an acid such as the isononanoic acid referred to in Example 1, or equivalent such as any suitable $C_4$–$C_{16}$ acid. The alcohol component may be higher or lower homologs of the listed materials, and the mix of alcohols may vary significantly from the approximately 50/50 mixtures referred to in Example 1.

The lower (isopropyl) alcohol which was listed as being optional in Example 1 is not necessary in the composition of Example 8A, but might be added if desired.

SUMMARY OF THE ABOVE EXAMPLES

In the foregoing Examples 1–8 illustrate the variety of proportions in which the ingredients are effective. Based on tests performed in pursuit of analyzing various formulas, the following range of proportions may be used in providing additive compositions which will be effective in achieving the objects of the invention.

| | |
| --- | --- |
| ethoxylated tallow amine (avg. 5 mols ethylene oxide) or similar tertiary amine-type surfactant | 5–40 parts |
| isononanoic acid (trimethyl hexanoic acid) or other suitable acid | 2–12 parts |
| n-octanol/n-decanol mixture (approx. 50% ea.) or similar alcohol or alcohol mix | 1–5 parts |
| preservative | 1200 ppm |
| cranberry or AUTOMATE RED B dye | 900 ppm |
| isopropyl alcohol (optional) | 0–8 parts |
| water | balanced to 100 parts total. |

In any of the above examples, a substitution of the $C_8$ acid referred to in Example 7 may be made for the $C_9$ acid, and a substitution of the ethoxylated coconut amine may be made for the ethoxylated tallow amine. The percentage of octanol and decanol in the above mixture may also be varied in ranges of from about 4 to 1 to about 1 to 4.

EXAMPLE 9

This example relates to the use of a composition of the type set forth in Examples 1–8 wherein, for various reasons, it may be desirable not only to emulsify the hydrocarbon supplying fuel to the fire, but also to provide a blanket of foam over the burning area. For this purpose, it is possible to add to the compositions of Examples 1–8 additional ingredients for the purpose of making a frothy, highly stable foam.

Preparation of a modified concentrate is as follows:

| Ingredients per Example 1 | 100 parts |
| --- | --- |
| Polyoxyethylene coconut amine | 7.68 parts |
| Coco-dimethylamidopropyl betaine | 1.45 parts |
| Sodium di-2-ethylhexyl sulfosuccinate | 1.45 parts |
| Fatty amide cationic surfactant | 1.45 parts |
| Total | 112.03 |

When a froth is created by mixing the above composition with the water under turbulent conditions, a highly stable foam will result. Thus, this concentrate was injected into a stream of water at a volumetric ratio of 1 part per hundred. In a test fire, water treated with the concentrate also proved highly effective, "knocking down" the fire and extinguishing it without leaving a flammable residue for potential re-ignition. The test fire was blanketed with a stable layer of foam which remained in place and was visible atop the pool of emulsified water and fuel. Thus, the composition of the invention appears compatible with foam-forming ingredients of the type described herein and is equally or perhaps more effective in firefighting when used with such supplemental materials.

In formulating this composition, the preferred order of addition is to provide a necessary water, and add the biocide and the dye thereto. Thereafter, the mixture of higher aliphatic alcohols (octanol/decanol) or their homologs are stirred into the mixture. Next, the aliphatic acid, in this case, 2-ethyl hexanoic acid is added. Thereafter, the coconut amine is added, following which the coco-dimethylamidopropyl betaine is added. Next, the fatty amide surfactant is added to the mixture and finally, the ethoxylated tallow amine component is stirred in. If a lower alcohol ($C_2$–$C_5$) is used, it may be added at this point.

Once the composition just described was mixed, a fire of the type described herein was prepared, and the composition of the invention was sprayed over the fire using the same equipment and at the same rate described in connection with Example 1. The fire was promptly extinguished and a high, persistent blanket of foam covered the test pit area. Study of the fire pit area revealed that the blanket of foam remained atop the liquid material, but the emulsifying or dispersing components of the firefighting composition worked to disperse the liquid fuel in the subnatant water layer. Accordingly, it was shown that while the covering foam and the extinguishing composition serving to disperse the flammable liquid within water were both applied together, each appeared to function separately in that the foam blanket remained atop the liquid phase while the dispersant composition was not retained within the foam layer but was free to contact the fuel/water layer and ultimately achieve the intimate mixing, dispersion or emulsification necessary to inhibit any restart of the fire, and render the hydrocarbon fuel non-volatile.

In contrast to the composition of the present invention, many of the most commonly used fire extinguishing agents, namely, most aqueous film-forming foams (AFFF) used to extinguish burning organic liquids are considered hazardous materials and have a finite shelf life. Accordingly, the materials are hazardous, and furthermore, their disposal also creates a hazardous waste problem. Unlike AFFF, the present compositions do not possess shortened shelf lives and are not themselves hazardous so as to require periodic disposition. Even if disposed of, they do not create forbidden hazards. While some foams have been described as being non-toxic, most or all of those presently in widespread use are known to be hazardous.

EXAMPLE 10

A concentrate composition was made according to Example 9, except that, when used to treat the same test fire, the concentrate was used at a volumetric ratio of 3 parts per hundred of treating water. The test results were satisfactory and perhaps achieved slightly faster extinguishing of the fire in relation to water having a reduced percentage of concentrate.

EXAMPLE 11

A composition according to Example 9 was prepared as stated therein, and in this example, the concentrate was injected into a stream of fire extinguishing water at a volumetric ratio of 6 parts per hundred. The fire and other conditions were identical, and this concentration of the composition provided slightly improved extinguishing qualities in terms of time response. Thus, Examples 9–11 demonstrate that concentration may vary from about 1 part or less to 6 parts of more of concentrate per hundred parts of water without compromising the effectiveness of the concentrate.

ADDITIONAL EXAMPLES

The following examples relate to hazardous situations that are commonly encountered, other than fires, but in which the hazards may be protected against using the inventive compositions. The risks held out, and the manner in which they are assessed and treated will now be discussed.

In many commonly occurring situations, fuel oil or the like is spilled in an area where it creates an immediate fire hazard. Applying the composition comprising the concentrate of the invention and a mass of water immediately eliminates the fire hazard. However, because the resulting treated fuel material may have what may be thought of as three possible destinations, one of three situations arises. The hydrocarbon fuel, in the event of being spilled on a waterway, from a boat or slip, for example, would directly enter a river or stream. Fuel may also enter a waterway where the spill involving a road vehicle occurs on a road in the vicinity of a river crossed by a bridge, into a river or creek adjacent the roadway. In such cases, the spilled petroleum and the treating material would be waterborne from the outset.

In another circumstance, the spill might be transferred to the soil, directly or indirectly, and the soil, while able to contain moisture, would be a primarily solid phase area rather than a liquid phase region. Contaminants, if not treated, would linger in the soil and eventually enter the ground water system. Most such spills come from vehicles, storage tanks or pipelines.

In the third common situation, the spill would occasion cleanup efforts directed at causing the spilled material to enter a sewage disposal system where sewage sludge is used for degradation. In the respective cases just discussed, the risks are primarily those of immediately contaminating the water in a waterway, contaminating the soil and eventually ground water, and finally, interfering with or reducing the effectiveness of sewage treatment. The greater the extent of the spill, if not treated, the more severe is the problem. In many cases, if the spill is not treated properly, the effects of the spill and/or the treatment can be relatively persistent as well as widespread.

Accordingly, the examples set out below are directed to illustrations of the effectiveness of the product involving respective spills of the kinds just discussed.

Referring now to various tests and simulations used to demonstrate the advantages of the invention in these situations, certain tests can be made for toxicity, and some for biodegradability. One such test procedure is known as a 96-hour acute toxicity test using a fish species identified as fundulus heteroclitus (the mummichog or killifish). This test is used to evaluate toxicity risks involving marine line existing in a medium (water) wherein the hazard arises from soluble toxins. Other tests involve using delicate invertebrates such as *Daphnia magna* (water flea), *Hyalella azteca* (an amphipod). Other fish used in toxicity tests include the *Pimephales promelas* (a fathead minnow). Other tests not directed to toxicity per se involve adsorption on columns of soil, followed by elutriation. The effectiveness of emulsification can be determined by comparing vapor pressure of the fuel before and after treatment.

Other tests involve biodegradability, which can be established through various tests and observations. In determining the nature and extent of biodegradability and the nature of the reactions between the various dispersant materials with which the invention is concerned and the combination of such material with fuels in water, and the degradation of such materials in the presence of bacteria or activated sludge, account is taken of several factors. These include the chemical oxygen demand (COD), the biochemical oxygen demand (BOD), the dissolved oxygen (DO) in the water, and the oxygen uptake rate (OUR).

Regarding another aspect of the biodegradability of the composition, the alcohols and carboxylic acids were, and are known to be, readily attacked by bacteria and degraded. In the surfactant composition, the oleophilic portion is based purely on animal fat and hence is readily biodegradable. The ethoxy substituents are also biodegradable. Thus, the composition as a whole is clearly biodegradable in keeping with accepted protocols.

EXAMPLES 12–14

The specimens of treated petroleum ("treated petroleum—1", "treated petroleum—2", and "treated petroleum—3") referred to in Examples 1–3 above, were tested for toxicity in comparison to hydrocarbon fuel (diesel oil). The specimens, which comprised an emulsified form of the petroleum making up the spill (diesel fuel), displayed no toxicity other than that attributed to diesel fuel itself, and thus demonstrated that the product, even when added to petroleum spills, does not harm the environment.

EXAMPLE 15

Example 15 involves so-called bio-remediation, one phase of which includes the removal of non-aqueous phase liquids (NAPLS) from surface and ground waters. In keeping with the invention, a test was conducted wherein a sample of #2 diesel fuel was placed in water and treated with the concentrate composition of the type described in Example 1, dispersed in water on the basis of 1%–10% by volume, and observed over an extended time. It was shown that the diesel fuel was attacked and broken down into soluble, non-toxic products by bacterial action. The relatively high rate of breakdown was attributed to the dispersion of the fuel and the great increase in its surface-to-volume ratio.

EXAMPLE 16

Example 16 also involves bio-remediation. Effectiveness of the treating composition was demonstrated using a test wherein, after diesel fuel was spilled on test soil, the soil was treated with a composition such as that referred to in Example 15, above. The composition containing the emulsifying and dispersing concentrate attacked and dispersed the fuel, with the resultant product working its way into the soil over a period of time. After such a time period, soil sampling and/or laboratory tests reveal that the emulsified and dispersed petroleum had been attacked by soil bacteria that were dispersing degrading the fuel material.

In addition, it was observed that the constituents of the surfactant portion of the emulsifying and dispersing concentrate were themselves also serving as nutrients for the bacteria. Consequently, bacterial multiplication and degradation of the fuel oil as well as the emulsifiers continued with the result that the soil contamination effectively disappeared over a satisfactory period of time.

EXAMPLE 17

This example also relates to so-called bio-remediation where soil is contaminated by hydrocarbon fuel. Using the same dispersed concentrate and contaminated test soil as in Example 16, the same procedure was followed, except that, after application of the dispersed concentrate, additional water-borne bacteria were added to the soil. These bacteria essentially replicated naturally occurring bacteria compatible with soil, but effectively provided a greatly increased concentration of bacteria.

The fuel oil was dispersed by the concentrate and then was digested and decomposed into soluble components much more rapidly than without the addition of bacteria. As pointed out in the introduction, microbial attack on most hydrophobic contaminants, including hydrocarbon fuels and lubricants, is extremely slow because of the low solubility of the contaminants in water. As is well known, many materials that are insoluble in water or aqueous solutions tend to be adsorbed onto the surface of water-insoluble materials and thus resist dispersion or solution in water. Accordingly, high molecular weight, non-polar oily materials such as petroleum or other hydrocarbons used as fuel or in industrial processes have a natural affinity for the hydrophobic portions of soils.

According to the present invention, the fine dispersion of spilled hydrocarbon fuels and other materials able to be achieved by the use of the inventive compositions serves to accelerate greatly their degradation by existing soil microbes. Moreover, compositions such as those set out in Example 1 are highly useful with contaminated soils to which additional bacteria are added in order to speed up the attack on the offending hydrocarbon materials. Thus, the mechanism appears to be that when the effective concentration of bacteria is greatly increased by supplementing natural bacteria with additional bacteria, and when the accessibility of the treated material to bacteria is greatly increased because of a great increase in surface-to-volume ratio of the spilled material, thus presenting an immense water/hydrocarbon interface area, bacteria will begin and continue to attack the contaminants at a high rate.

In addition, the surfactants themselves serve as nutrients for the bacteria to continue the degrading action.

EXAMPLE 18

In this example, a test spill involving diesel fuel was treated with a emulsifying concentrate of the types described in the examples herein, dispersed in water at a volume dilution of 1% up to 10%. The test spill material was flushed into a sewage treatment system that involved collection and treatment using sewage sludge, preferably activated sludge.

The tests and demonstrations involved in adding the dispersing composition to such spills for ultimate treatment by sewage demonstrated that the principal drawbacks of sewage treatment of hydrocarbon fuel spills was overcome by the composition of the invention. These drawbacks basically comprise the general resistance to degradation of the hydrocarbon fuel when it is untreated and secondly relate to the covering of sludge with an oily coating, rendering it unable to perform its intended degradation of sewage materials generally.

Thus, in the prior art, a petroleum spill could compromise the effectiveness of sewage treatment as well as fail to be degraded by the material. The concentrate of the invention, even when dispersed in large volumes of water, was able to overcome these drawbacks. Treated petroleum was readily digested by the sewage sludge, including activated sludge within a satisfactory time period. Moreover, the fine dispersion of the fuel left major portions of the surface open and available for treatment of the surrounding sludge. Hence, the composition rendered the petroleum fuel compatible with accepted sewage treatments. This in turn enabled petroleum hydrocarbons to be disposed of by washing and entry into municipal sewer systems without undue damage.

SUMMARY OF ADVANTAGES

From the foregoing tests and examples, it is apparent that the compositions of the invention, in contrast to certain known compositions intended for the same ultimate purpose, have the advantages of biodegradability, and non-toxicity, enabling them to be used in many applications wherein other such compositions would not be acceptable. As the result of their biodegradability, a cleanup would not be required after the application results in extinguishing a fire, with portions of the unburned or residual spill being not requiring expensive cleanup. In firefighting performance, so-called "flashback" is prevented by the ability of the composition to emulsify so-called Class B flammable liquids. The composition has proven effective on both Class A and Class B fires. In contrast to the use of AFFF, the composition of the invention is not limited by concerns about breaking or opening the foam blanket created by application of AFFF. Consequently, more aggressive firefighting techniques, i.e., more intense agitation of the liquid surface and use of high application rates may be employed to reduce the potential for re-ignition of an existing fire.

It will thus be seen that the present invention provides several novel compositions and methods for treating hydrocarbon materials, such methods and compositions having a number of advantages and characteristics, including those expressly pointed out here, and others which are inherent in the invention. Various illustrative embodiments of the product of the invention having been shown and described by way of example, it is anticipated that variations to the described compositions and methods will occur to those skilled in the art and that such modifications and changes may be made without departing from the spirit of the invention, or the scope of the appended claims.

I claim:

1. A method of firefighting including the steps of preparing a biodegradable, non-toxic foamable firefighting concentrate composition comprising, by volume, from about 4 to about 40 parts of an ethoxylated $C_{16}$–$C_{18}$ tertiary amine having 2–10 ethoxy groups per mol, from about 1 to about 15 parts of at least one aliphatic carboxylic acid having from 6 to 12 carbon atoms; about 1 to 6 parts of at least one of a $C_7$–$C_{12}$ aliphatic alcohol, from 0 to 10 parts of a $C_4$ and lower alcohol, from about 3 to about 10 parts of an ethoxylated amine derived from coconut oil, from about 0.5 to about 2 parts of a fatty amide type cationic surfactant, from about 0.5 to about 2 parts of an aliphatic substituted coco-amidopropyl betaine, and a preservative, and the balance being water to create a total of about 100 parts by volume, said concentrate composition additionally including injecting said concentrate composition at high pressure into a turbulent stream of firefighting water such that said firefighting water includes from about 0.5% to about 6% of said concentrate composition, and directing said firefighting water toward a target to create a wetted target area covered at least in part by a blanket of stable, fire resistant foam.

2. A biodegradable, non-toxic firefighting concentrate composition capable of dispersing hydrocarbon fuels in water and thus extinguishing hydrocarbon fuel fires, said composition comprising, by volume, from about 4 to about 40 parts of an alkoxylated $C_{16}$–$C_{18}$ tertiary amine having 2–10 alkoxy groups per mol, from about 1 to about 15 parts of at least one aliphatic carboxylic acid having from 6 to 12 carbon atoms; about 1 to 6 parts of at least one of a $C_6$–$C_{16}$ aliphatic alcohol, from 0 to 10 parts of a $C_4$ and lower alcohol, and the balance being water to create a total of about 100 parts by volume, said concentrate having such capability when diluted with up to 200 parts of water per part of concentrate.

3. A composition as defined in claim 2 wherein said alkoxylated tertiary amine is an ethoxylated tallow amine composition having an average of about 5 mols ethylene oxide per molecule of tallow amine.

4. A composition as defined in claim 2 wherein said aliphatic carboxylic acid comprises isononanoic acid.

5. A composition as defined in claim 2 wherein said aliphatic carboxylic acid includes 2-ethyl hexanoic acid.

6. A composition as defined in claim 2 wherein said composition includes a biocide preservative sufficient to prevent bacterial degradation of said concentrate material.

7. A firefighting liquid comprising the firefighting concentrate composition of claim 2 diluted with an amount of water such that said concentrate composition is present in said firefighting liquid at a proportion of about 0.5 to about 8 parts of concentrate composition per hundred parts of water.

8. A composition as defined in claim 2 which further includes from about 3 to about 10 parts of an ethoxylated amine derived from or palm kernel coconut oil, from about 0.5 to about 2 parts of a fatty amide type cationic surfactant, from about 0.5 to about 2 parts of an aliphatic substituted coco-amidopropyl betaine, and a preservative, said parts being based on 100 parts of the composition of claim 1.

9. A composition as defined in claim 2 which said alkoxylated amine is an ethoxylated ether amine.

10. A composition as defined in claim 2 in which said ethoxylated amine is an ethoxylated propylene diamine.

11. A composition as defined in claim 2 wherein said $C_6$–$C_{12}$ alcohol comprises a mixture of n-octanol and n-decanol.

12. A composition as defined in claim 11 wherein said mixture of alcohols is from about 40% to about 60% of n-octanol and the remainder is n-decanol.

13. A composition as defined in claim 2 which further includes sufficient color dye to render said water in which the firefighting composition is dispersed sufficiently visible to indicate that said firefighting concentrate is present in said water in an effective amount.

14. A composition as defined in claim 13 wherein said composition includes a biocide preservative sufficient to prevent bacterial degradation of said concentrate material.

15. A composition as defined in claim 2 wherein said amine material is present in an amount from about 10 to about 15 parts, said carboxylic acid being present in an amount of from about 7 to about 10 parts, said $C_7$–$C_{12}$ alcohol being present in an amount of from about 1.5 parts to about 4 parts, all based on said 100 parts of water.

16. A composition as defined in claim 15, said composition further including from about 3 to about 10 parts of an ethoxylated amine derived from coconut oil, from about 0.5 to about 2 parts of a fatty amide type cationic surfactant, from about 0.5 to about 2 parts of an aliphatic substituted coco-amidopropyl betaine, and a preservative, said parts being based on 100 parts of the composition of claim 1.

17. A biodegradable, non-toxic firefighting concentrate composition, said composition comprising, by volume, from about 4 to about 40 parts of an alkoxylated $C_{16}$–$C_{18}$ tertiary amine surfactant, from about 1 to about 15 parts of at least one carboxylic acid having from 4 to 16 carbon atoms; about 1 to 6 parts of at least one of a $C_6$–$C_{14}$ alcohol, from 0 to 10 parts of a $C_4$ and lower alcohol, and the balance being water to create a total of about 100 parts by volume, said tertiary amine surfactant including a lipophilic portion and a hydrophilic portion rendering said amine surfactant, in the presence of said acid and said alcohol, being capable of emulsifying petroleum hydrocarbons in water, said concentrate having said emulsifying and firefighting capability when diluted with up to 100 parts of water per part of concentrate.

18. A biodegradable concentrate composition as defined in claim 17 wherein said tertiary amine surfactant is an alkoxylated $C_{16}$–$C_{18}$ tertiary amine having 2–10 alkoxy groups per mol.

19. A composition as defined in claim 18 wherein said alkoxylated amine is an ethoxylated amine.

20. A surfactant composition for dilution with water to create a firefighting concentrate, said surfactant composition comprising about 56% of an alkoxylated $C_{16}$–$C_{18}$ tertiary amine surfactant, about 34% of a carboxylic acid having from about 4 to 16 carbon atoms and about 10% of at least one $C_6$–$C_{16}$ alcohol, said tertiary amine surfactant including a lipophilic portion and a hydrophilic portion rendering said amine surfactant, in the presence of said acid and said alcohol, capable of emulsifying petroleum hydrocarbons in water, said surfactant composition being dilutable with water to form a concentrate wherein said surfactant composition is present in an amount of about 15% to about 60% of said firefighting concentrate.

* * * * *